(12) United States Patent
Fuller

(10) Patent No.: US 7,690,003 B2
(45) Date of Patent: Mar. 30, 2010

(54) SYSTEM AND METHOD FOR INCREASING DATA THROUGHPUT USING THREAD SCHEDULING

(76) Inventor: Jeffrey C. Fuller, 9113 228th Way NE., Redmond, WA (US) 98053

(*) Notice: Subject to any disclaimer, the term of this patent is extended or adjusted under 35 U.S.C. 154(b) by 858 days.

(21) Appl. No.: 10/652,709

(22) Filed: Aug. 29, 2003

(65) Prior Publication Data
US 2005/0050552 A1   Mar. 3, 2005

(51) Int. Cl.
*G06F 3/00* (2006.01)
(52) U.S. Cl. .................... 719/321; 719/314
(58) Field of Classification Search ........... 719/321, 719/314
See application file for complete search history.

(56) References Cited

U.S. PATENT DOCUMENTS

| | | | |
|---|---|---|---|
| 5,060,140 A * | 10/1991 | Brown et al. ............. 710/105 |
| 5,247,675 A | 9/1993 | Farrell et al. |
| 5,630,128 A | 5/1997 | Farrell et al. |
| 5,732,286 A * | 3/1998 | Leger .................... 710/57 |
| 5,812,844 A | 9/1998 | Jones et al. |
| 5,875,329 A * | 2/1999 | Shan .................... 719/314 |
| 6,289,369 B1 | 9/2001 | Sundaresan |
| 6,427,161 B1 | 7/2002 | LiVecchi |
| 6,578,065 B1 | 6/2003 | Aglietti et al. |
| 6,880,017 B1 * | 4/2005 | Marce et al. ............. 709/232 |
| 2004/0085977 A1 * | 5/2004 | Gaur .................... 370/412 |
| 2008/0010383 A1 * | 1/2008 | Miyoshi et al. ........... 709/231 |

OTHER PUBLICATIONS

Avi, Silberschatz, Peter Galvin and Greg Gagne; "Applied Operating System Concepts" First Edition, John Wiley & Sons, Inc., 2000; pp. 145-147, 158-159, 297-308, 412-420, 469-477, 487-491, 721-725.*
Avi, Silberschatz, Peter Galvin and Greg Gagne; "Applied Operating System Concepts" First Edition, John Wiley & Sons, Inc., 2000; pp. 19-26.*
Silberschatz et al., "Applied Operating System Concepts," First Edition, John Wiley & Sons, Inc., 2000.*
Tanenbaum, A.S., "Operating Systems: Design and Implementation" p. 58-63 (1987).

(Continued)

*Primary Examiner*—Lechi Truong
(74) *Attorney, Agent, or Firm*—Marshall, Gerstein & Borun LLP

(57) ABSTRACT

A system and method for delivering data from a device driver to an application increases the usage of synchronous processing (fast I/O mode) of data requests from the application by utilizing thread scheduling to enhance the likelihood that the requested data are available for immediate delivery to the application. If the amount of data in a data queue for storing data ready for delivery is low, the thread scheduling of the system is modified to promote the thread of the device driver to give it the opportunity to place more data in the data queue for consumption by the application. The promotion of the thread of the device driver may be done by switching from the application thread to another thread (not necessarily the device driver thread), boosting the device driver's priority, and/or lowering the priority of the application, etc.

18 Claims, 5 Drawing Sheets

OTHER PUBLICATIONS

Anonymous, "Introduction (Web and Application Server Infrastructure-Performance and Scalability)" (Jan. 1, 2003).

"Recv( ); recvfrom( ); and recvmsg( )" FreeBSD System Calls Manual http://threads.seas.gwu.edu/cgi-bin/man2web?program=recv&section= (Feb. 21, 1994).

Guest Contributor, "Request-queue Strategies for Application Servers" http://articles.techrepublic.com.com/5100-22-1045124.html (Mar. 21, 2002).

Kleiman S, Shah D. Smaalders, B, "Programming with Threads" p. 209-11, 378-82, 445-48, and 462 (1996).

European Search Report based on International Application No. 04019745.1—Filed Aug. 19, 2004; Date of Mailing: Aug. 7, 2007.

Communication pursuant to Article 94(3) EPC for EP 04 019 745.1-1243 dated Apr. 17, 2008.

* cited by examiner

SYSTEM AND METHOD FOR INCREASING DATA THROUGHPUT USING THREAD SCHEDULING

TECHNICAL FIELD

This invention relates generally to computer data processing, and more particularly to the operation of providing data for processing by an application.

BACKGROUND OF THE INVENTION

Data input/out (I/O), which involves passing data from one computer component to another, is often a limiting factor or bottleneck in digital processing. For instance, an application running on a computer typically relies upon a device driver on a lower level (e.g., in the kernel mode) to feed data to it for processing. The performance of the application thus depends on how efficiently the driver can provide the data it needs for performing its task.

Conventionally, the application may receive data from the device driver in two modes. In the first mode, the application posts a request to receive data from the device driver if the requested data is currently unavailable. This request is handled asynchronously in that the application does not wait for the device driver to provide the requested data, and the requested data are delivered to the application at a late time when the data become available. In the second mode, the request for data is synchronously processed. In this case, the requested data are already placed in a queue and can be delivered immediately in response to the request. The asynchronous method of data delivery is generally less preferred because it incurs substantial processing and memory overhead, due to the need to allocate and initialize data structures for tracking the data request, as well as the overhead of asynchronous completion. The synchronous mode, in contrast, has no such overhead, but requires that the driver already has data queued for pickup in response to a system call by the application. Since there is no delay in delivering the requested data, the synchronous mode is also called "fast I/O" on the Microsoft Windows platform, although other platforms may use different terminology. Since the synchronous method has the advantages of significantly reduced overhead and immediate data delivery, it is desirable to increase its usage over that of the asynchronous method.

SUMMARY OF THE INVENTION

In view of the foregoing, the present invention provides a system and method for delivering data from a device driver to an application that increases the usage of the synchronous processing (i.e., the fast I/O mode) of data delivery to the application by utilizing thread scheduling to enhance the likelihood that the requested data are available for immediate delivery. When the application needs data for processing, a data queue used by the device driver to store data ready for delivery to the application is checked. If the amount of data in the data queue is low, the thread scheduling of the system is modified to promote the thread of the device driver, thereby giving the device driver the opportunity to place more data in the data queue for consumption by the application. The promotion of the thread of the device driver may be done in different ways, including switching from the application thread to another thread (not necessarily the device driver thread), boosting the device driver thread's priority, and/or lowering the priority of the application thread, etc.

DETAILED DESCRIPTION OF THE INVENTION

Figure 1:
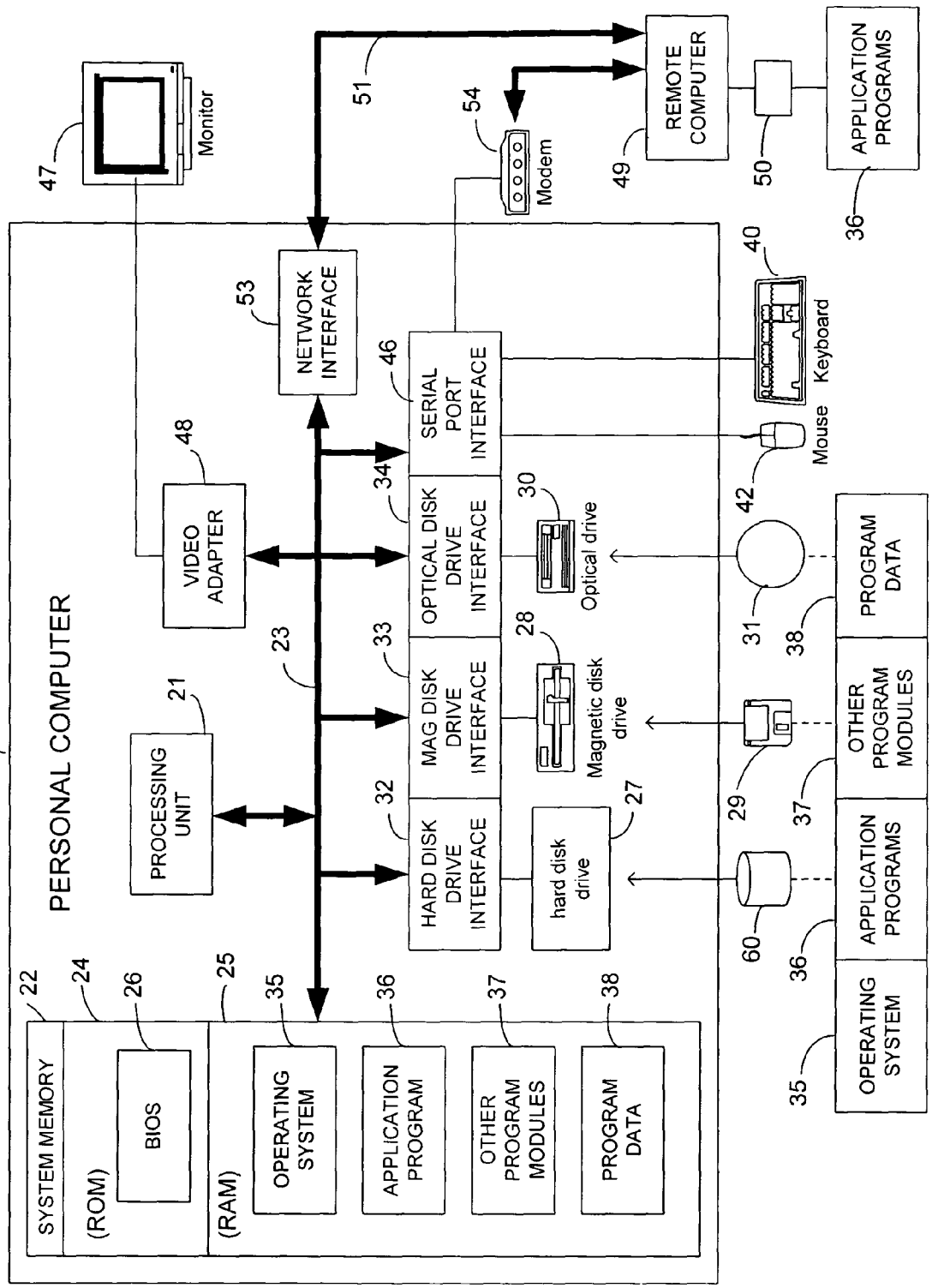
FIG. 1 is a block diagram generally illustrating an exemplary computer system on which the object quota management for a directory service of the present invention may be implemented.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

The following description begins with a description of a general-purpose computing device that may be used for implementing the invention, and the system and method of the invention for promoting fast data I/O by means of thread scheduling will be described in greater detail with reference to FIGS. 2-5. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various acts and operations described hereinafter may also be implemented in hardware.

Figure 2:
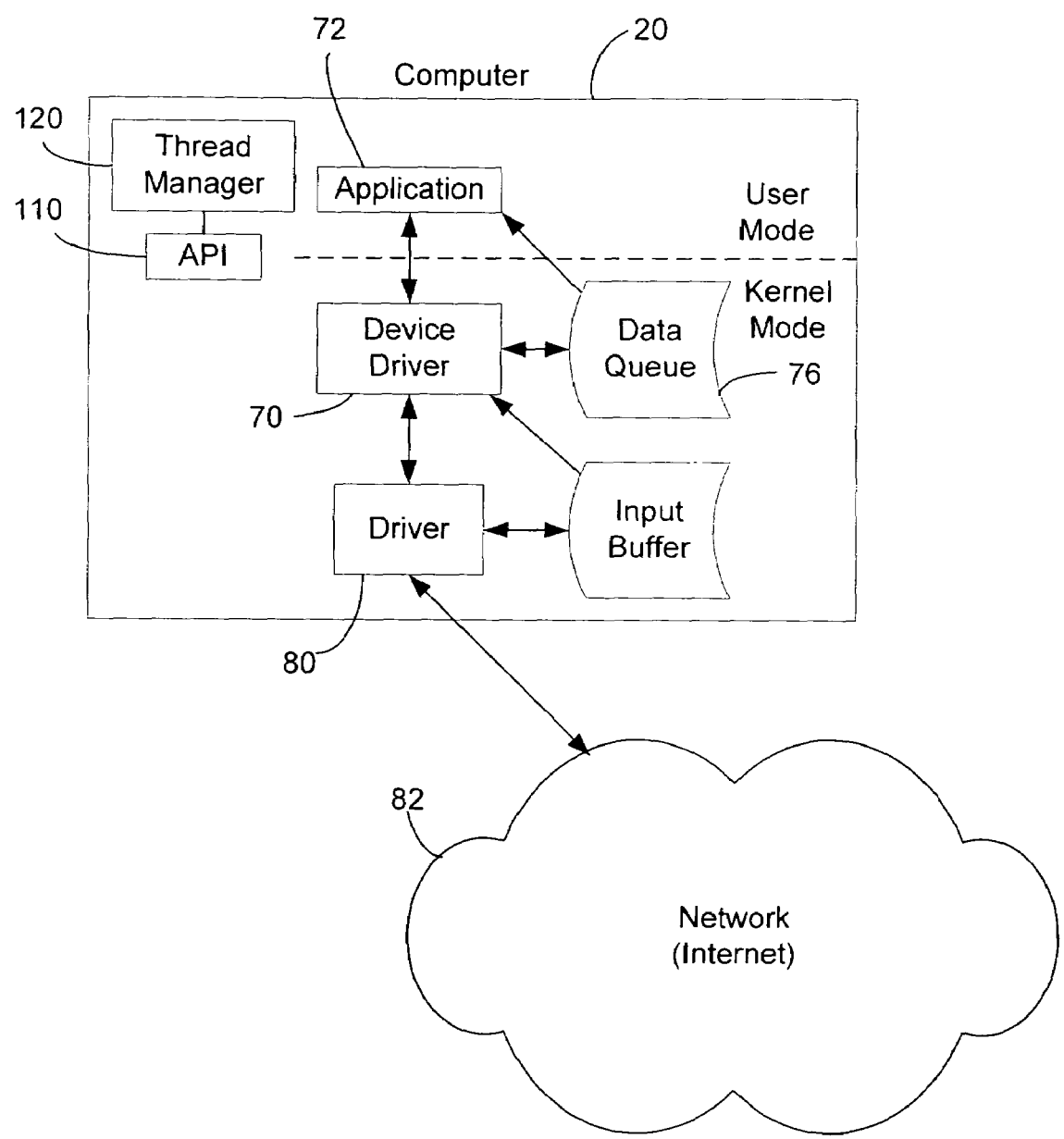
FIG. 2 is a schematic diagram showing a computer system that implements an embodiment of the invention to promote the usage of synchronous processing (i.e., fast I/O) of data requests to deliver data from a driver to an application.

Referring to FIG. 2, the present invention is directed to a system and method for improving the throughput of data from a device driver 70 to an application 72. The device driver feeds the data required by the application to perform its functionality. To enhance the efficiency of data delivery to the application 72, the device driver maintains a data queue 76 that stores data ready for immediate delivery to the application. As illustrated in FIG. 2, the device driver 70 is typically on a lower level of the computer architecture than the application 72. For instance, the device driver 70 may be in a kernel mode of the operating system, while the application 72 runs in the user mode of the operating system. The device driver 70 may receive the data from a data source, which may be another driver 80 on a lower level. The data source may in turn receive the data from another source. For instance, in the embodiment illustrated in FIG. 2, the driver 80 may receive the data from a network 82, such as the Internet.

There are two modes for delivering data from the device driver 70 to the application 72, depending on whether there is sufficient data in the data queue 76 for consumption by the application. In a "slow I/O" mode, there is not enough data in the data queue 76, and the application 72 makes a request for asynchronous data delivery. The data are delivered to the application 72 later when the data become available to the device driver 70. Besides being slow, this mode of data delivery also has the disadvantage of high overhead in memory and processing, because data structures have to be allocated and initialized to track the asynchronous data requests. In contrast, in a "fast I/O" mode, the application 72 posts synchronous data requests, and the requested data are delivered to the application immediately. This mode of data delivery does not incur the types of overhead of the asynchronous mode. Moreover, the data need by the application is immediately made available to the application. Since the application can perform its functions only when it has the data it needs, the performance of the application depends on how quickly it can have the data delivered to it when it need them. Thus, the performance of the application may be significantly improved if the data delivery is carried out most of the time in the fast I/O mode. The necessary condition for the fast I/O mode is, of course, that the data requested by the application 72 are already in the data queue 76 for consumption by the application.

Figure 3:
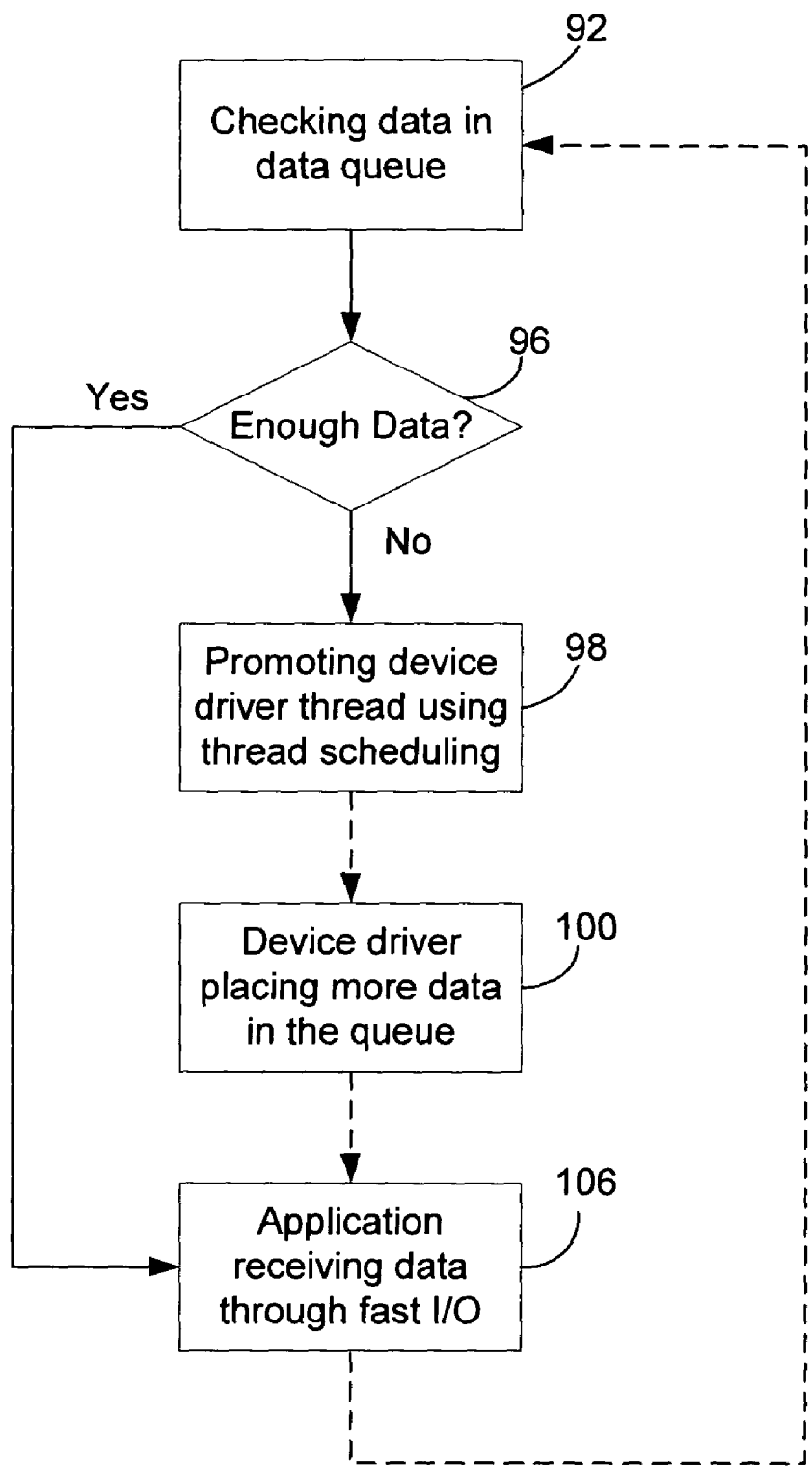
FIG. 3 is a flowchart summarizing a method of increasing the usage of fast I/O by means of thread scheduling.

In accordance with a feature of the invention, the likelihood of having sufficient data in the data queue 76 for fast I/O is increased by giving the device driver 70 more opportunities to populate the data queue with new data, which is achieved by means of thread scheduling. Referring to FIG. 3, to ensure that the data queue 76 contains sufficient data to allow data delivery in the fast I/O mode, the amount of data in the data queue 76 is checked from time to time (step 92). This checking can be done, for instance, each time the application 72 needs more data but before it issues a data request. Alternatively, the checking may be done each time the data source (e.g., the driver 80) has more data for the device driver. If it is determined (step 96) that the amount of data in the data queue 76 is too low (e.g., lower than a pre-selected threshold), the thread scheduling of components running on the computer system is modified (step 98) to promote the thread of the device driver to give the device driver a chance of putting more data into the data queue. As used herein, "promoting" the device driver thread means that making it quicker for the device driver thread to get its turn to be run. When the thread of the device driver is run, the device driver 70 can put more data into the data queue 76 (step 100) if such data are available from the source. Later, when the application thread is run, the application can retrieve the data in the data queue via fast I/O (step 102).

Referring back to FIG. 2, how thread scheduling may be modified depends on the implementation of the operating system. For instance, application programming interface (API) functions 110 may be provided for components of the computer to call to change their priorities in thread scheduling or to switch to other threads. In one embodiment, the application 72 checks whether there is sufficient data in the data queue 76 before it requests for data. If the amount of data is deemed low, the application thread yield the processor to another thread by calling the appropriate function of the API 110 to inform the thread manager 120 its intent to yield. It should be noted that the next thread to be switched in may not be the device driver thread. Nevertheless, by simply yielding its thread to another one, the application has accelerated the time for the device driver thread to be switched in, and gives the device driver a chance to queue more data before posting a data request.

As mentioned earlier, besides switching from the application thread to another thread, the promotion of the device driver thread may also be achieved by boosting the priority of the device driver thread, or lowering the priority of the application thread. The boosting or lowering of the priority of a thread may be done by calling of the API functions. In one embodiment, either the application 72 or the device driver 70 can call the API 110 to boost the priority of the device driver thread. Alternatively or additionally, the data source for device driver, which is the driver 80 in the embodiment of FIG. 2, may call the API to boost the priority of the device driver thread.

Figure 4:
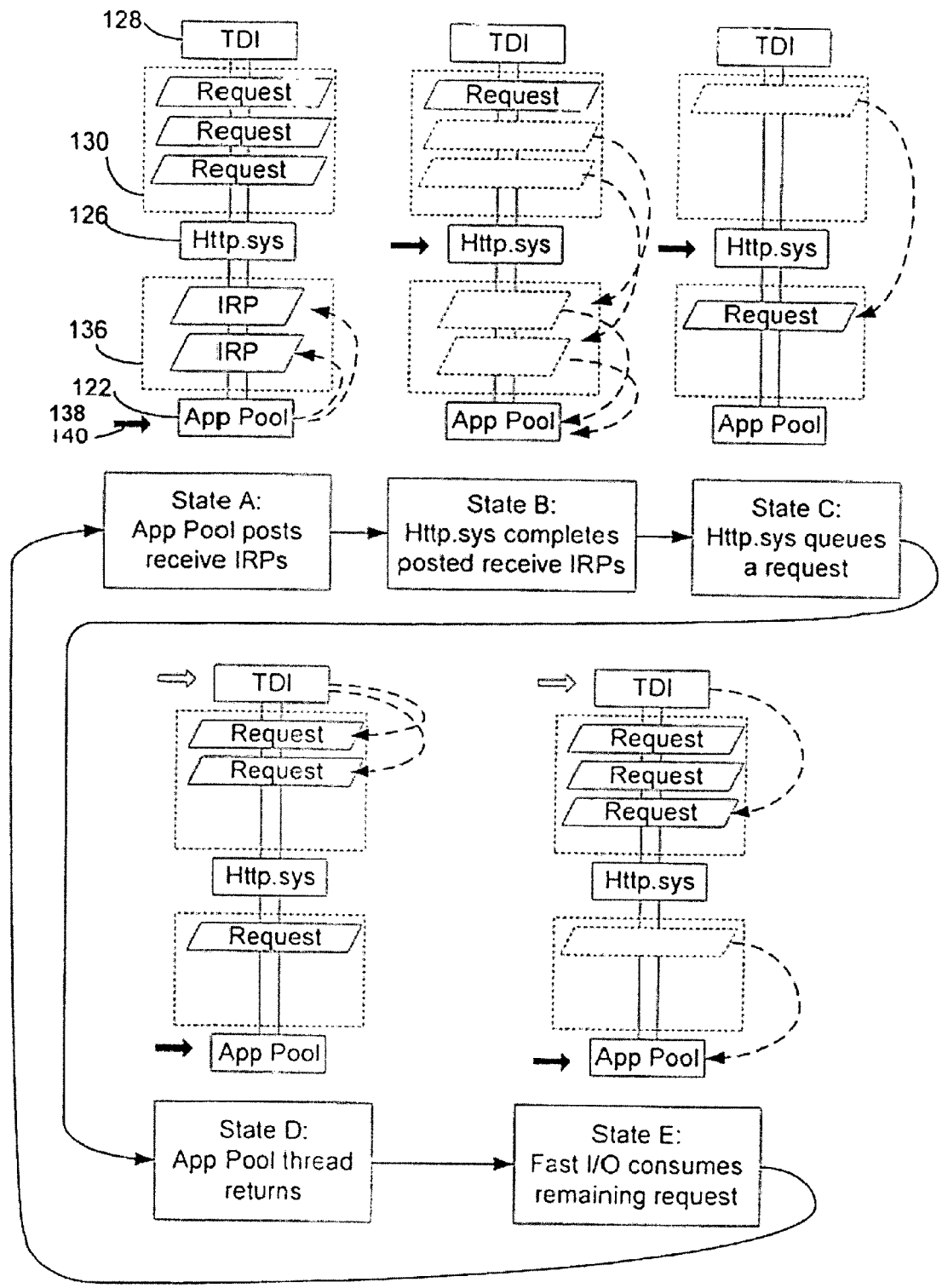
FIG. 4 is a schematic diagram showing various states of the device driver and its data queue as an example in which asynchronous data delivery is used in a conventional way.
Figure 5:
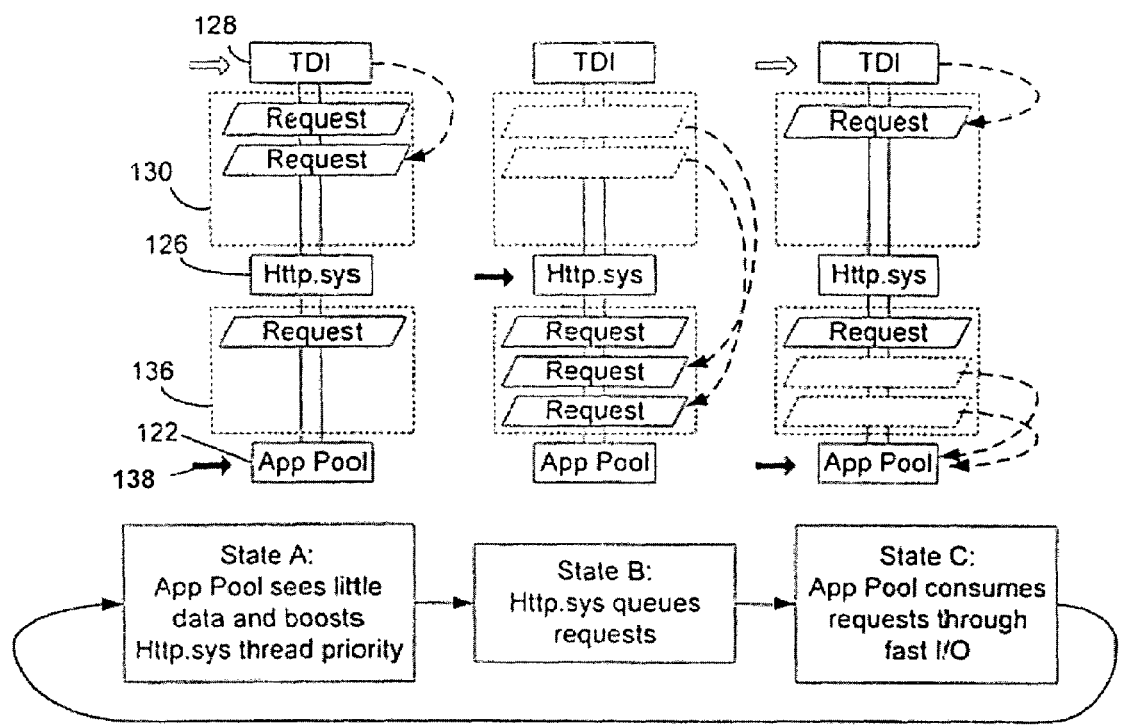
FIG. 5 is a schematic diagram showing states of the device driver and its data queue as an example of the effect of promoting the usage of fast I/O by means of modifying thread scheduling in accordance with an embodiment of the invention.

To illustrate the effects of promoting fast I/O utilizing thread scheduling, an example of the conventional synchronous processing and an example of fast I/O promotion are provided in FIGS. 4 and 5, respectively. In these two examples, the application is called "App Pool," which is for serving Web requests received from the Internet. In this case, the data to be processed by the App Pool are in the form of Web requests. The device driver that is responsible for feeding the Web requests to the App Pool is an Http.sys driver 126. The Http.sys driver 126 in turn receives the Web requests from a Transport Driver Interface (TDI) driver 128, which receives the request from the Internet. The TDI driver 128 has a buffer 130 for storing Web requests it receives from the network to be picked up by the Http.sys driver. Similarly, the Http.sys driver 126 has a queue 136 for storing requests to be picked up by the App Pool 122.

In the example illustrated in FIG. 4, the fast I/O promotion of the invention is not implemented, and the App Pool 122 posts conventional asynchronous data requests when there is no data (Web requests) in the queue 136 for it to process. Five consecutive states of the queue 136 and the buffer 130, labeled A-E, are shown in FIG. 4. The arrow 138 is used to indicate which of the App Pool 122, Http.sys driver 126, or the TDI driver 128 has the processor, i.e., has its thread running. Thus, in state A, the App Pool thread is running. When the App Pool 122 tries to receive Web requests, it discovers that that the queue 136 is empty. As is conventional, the App Pool 122 posts two "receive IRPs" in the queue 136. An IRP ("I/O request packet") is a data structure used for asynchronous delivery of data. In state B, it is the turn of the Http.sys thread to run. The Http.sys completes the two posted receive IRPs using Web requests it retrieves from the buffer 130. In state C, the Http.sys moves the remaining Web request in the buffer 130 to the queue 136. In state D, the App Pool thread returns. At this time, there is one Web request in the queue 136. While the App Pool is processing, the TDI driver 128, which is interrupt driven, may place more Web requests into the buffer 130. In state E, the App Pool consumes the only Web request in the queue 136 through fast I/O, and becomes starved for data again. In the meantime, the TDI continues adding Web requests to the buffer.

In the example illustrated in FIG. 5, the fast I/O promotion has been implemented. FIG. 5 shows three states labeled A-C. Preferably, the App Pool will always find a data item in the queue 136 when doing a receive call. When a Web request is present in the queue 136, the receive call is completed immediately through fast I/O. This can happen more frequently is an Http.sys thread is promoted when the App Pool is close to depleting the data in the queue 136. As shown in state A, the App Pool 122 checks the queue 136 and sees little data remaining in the queue. In response, the App Pool 122 yields its thread and boosts the priority of the Http.sys thread to make the Http.sys more likely to run. In state B, the Http.sys thread runs, and the Http.sys driver moves Web requests from the buffer 130 to the queue 136. When the App-Pool thread returns in state C, there are sufficient Web requests in the queue 136 for it to retrieve via fast I/O. When the number of requests in the queue 136 becomes low again, the App Pool thread yields to another thread.

In view of the many possible embodiments to which the principles of this invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

What is claimed is:

1. A computer-readable storage medium having computer-executable instructions for performing steps for delivering data from a device driver to an application, comprising:

executing the device driver having a data queue, the execution of the device driver controlled by a device driver thread;

executing the application, the execution of the application controlled by an application thread;

the device driver populating the data queue with data items, the data items being requested by the application for synchronous delivery from the device driver to the application, the device driver in communication with the data queue;

determining an amount of data items in the data queue; if the amount of data items in the data queue meets or exceeds a threshold, the device driver synchronously delivering one or more data items from the data queue to the application in response to a synchronous data request from the application; and if the amount of data items in the data queue is below the threshold, stopping execution of the application thread and boosting an execution priority of the device driver thread, the boosted device driver thread populating the data queue with new data items;

wherein the device driver comprises an Http.sys driver and the data items include Web requests received from a Transport Driver Interface (TDI) driver;

wherein a Transport Driver Interface (TDI) driver for receiving the Web requests to be processed by the application, the TDI driver placing the received Web requests in a buffer for retrieval by the Https.sys driver, the Http.sys driver forwarding the received Web requests to the application upon execution of a receive call;

wherein the computer-executable instructions further comprise instructions for modifying thread scheduling of a computer system with an API function, wherein the application calls the API function to promote the execution priority of the Http.sys driver thread and stop the execution of the application thread.

2. A computer-readable storage medium as in claim 1, wherein modifying the execution of one or more of the Http.sys driver thread or the application thread and populating the data queue with new Web requests includes the application thread yielding a processor to another thread executing on the computer.

3. A computer-readable storage medium as in claim 1, wherein modifying the execution of one or more of the device driver thread or the application thread and populating the data queue with new data items includes decreasing an execution priority of the application thread.

4. A computer-readable storage medium as in claim 1, having further computer-readable instructions for moving, by the device driver, data items from a buffer of the TDI driver into the data queue for delivery to the application.

5. A computer-readable storage medium as in claim 1, wherein the TDI driver receives the Web requests from an Internet and stores the Web requests in a TDI driver buffer to be picked up by the Http.sys driver for populating the data queue.

6. A computer-readable storage medium as in claim 5, having further computer-readable instructions for:
receiving, by the TDI driver, Web requests from the Internet;
storing, by the TDI driver, the received Web requests into a buffer;
moving, by the Http.sys driver, the Web requests in the buffer into the data queue for synchronous delivery to the application in response to the synchronous data request from the application.

7. A computer-readable storage medium as in claim 1, wherein modifying the execution of one or more of the device driver thread or the application thread and populating the data queue with new data items includes calling an API function for modifying thread scheduling of a computer.

8. A method for delivering data from a device driver to an application running on a computer that implements thread scheduling, comprising:
executing the application at a user level of the computer, the execution of the application controlled by an application thread;
executing an Http.sys driver having a data queue at a kernel level of the computer, the execution of the Http.sys driver controlled by an Http.sys driver thread;
the Http.sys driver receiving Web requests from a buffer in communication with a Transport Device Interface (TDI) driver that first receives the Web requests from an Internet, the Http.sgs driver populating the data queue with the Web requests that are requested by the application for synchronous delivery from the Http.sys driver to the application, the Http.sys driver in communication with the data queue;
the application determining an amount of data items in the data queue; if the amount of the Web requests in the data queue meets or exceeds a threshold, synchronously delivering Web requests from the data queue to the application; and
if the amount of the Web requests in the data queue is below the threshold, yielding execution of the application thread and promoting execution of the Http.sys driver thread by means of thread scheduling;
wherein promoting the Http.sYs driver thread by means of thread scheduling includes of yielding an execution of the application thread and accelerating an execution time of the Http.sys driver thread to populate the data queue with new Web requests;
wherein the Transport Driver Interface (TDI) driver for receiving the Web requests to be processed by the application, the TDI driver placing the received Web requests in a buffer for retrieval by the Https.sys driver, the Http.sys driver forwarding the received Web requests to the application upon execution of a receive call;
wherein the method further comprise instructions for modifying thread scheduling of a computer system with an API function, wherein the application calls the API function to promote the execution priority of the Http.sys driver thread and stop the execution of the application thread.

9. A method as in claim 8, wherein promoting the thread of the Http.sys driver includes yielding a thread of the application to another thread that is not the Http.sys driver thread.

10. A method as in claim 8, wherein promoting the thread of the Http.sys driver includes boosting an execution priority of the thread of the Http.sys driver.

11. A method as in claim 8, wherein promoting the thread of the Http.sys driver includes decreasing an execution priority of the application thread.

12. A method as in claim 8, further including moving, by the Http.sys driver, data items from a buffer of a second driver into the data queue for delivery to the application.

13. A method as in claim 8, further including receiving, by the TDI driver, the Web requests from an Internet; storing, by the TDI driver, the received Web requests into a buffer; and moving, by the Http.sys driver, the Web requests in the buffer into the data queue for synchronous delivery to the application.

14. A method as in claim 8, wherein promoting the thread of the Http.sys driver includes calling an API function for modifying thread scheduling of the computer.

15. A computer system comprising:
a memory that stores computer-executable instructions;
a processor being adapted to execute the computer-executable instructions, wherein the memory stores the computer-executable instructions in a tangible form, the computer-executable instructions comprising instructions for:
scheduling threads of the computer system, the threads corresponding to an application and an Http.sys driver having a data queue; the Http.sys driver and the application executing on the processor of the computing system;
the Http.sys driver receiving Web requests from a buffer in communication with a Transport Device Interface (TDI) driver that first receives the Web requests from an Internet, the Http.sys driver further storing a plurality of Web requests for the application in the data queue;
the application first determining if a total number of the Web requests in the data queue meets, exceeds, or falls below a threshold and, if the total number of the Web requests in the data queue meets or exceeds the threshold, executing a receive call to request one of the plurality of Web requests from the data queue and synchronously delivering the requested Web request to the application;

if the total number of the Web requests in the data queue falls below the threshold, stopping execution of the application thread and promoting an execution priority of the Http.sys thread, one of the threads of the computer system to store the promoted Http.sys thread storing new Web requests in the data queue;

wherein the Transport Driver Interface (TDI) driver for receiving the Web requests to be processed by the application, the TDI driver placing the received Web requests in a buffer for retrieval by the Https.sys driver, the Http.sys driver forwarding the received Web requests to the application upon execution of the receive call;

wherein the computer-executable instructions further comprise instructions for modifying thread scheduling of the computer system with an API function, wherein the application calls the API function to promote the execution priority of the Http.sys driver thread and stop the execution of the application thread.

16. A computer system as in claim 15, wherein promoting an execution priority of the Http.sys thread one of the threads of the computer system if the total number of the Web requests in the data queue is below the threshold comprises yielding a thread of the application to the Http.sys thread.

17. A computer system as in claim 15, wherein promoting an execution priority of the Http.sys thread if the total number of the Web requests in the data queue is below the threshold comprises boosting an execution priority of the Http.sys thread.

18. A computer system as in claim 15, wherein promoting an execution priority of the Http.sys thread if the total number of the Web requests in the data queue is below the threshold comprises lowering a priority of the application thread.

* * * * *